United States Patent
Arnold et al.

(10) Patent No.: US 8,483,918 B2
(45) Date of Patent: Jul. 9, 2013

(54) METHOD FOR OPERATING A TRANSMISSION WITH AT LEAST ONE POSITIVE-LOCKING SHIFTING ELEMENT

(75) Inventors: Jorg Arnold, Immenstaad (DE); Valentine Herbeth, Friedrichshafen (DE); Georg Mihatsch, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 218 days.

(21) Appl. No.: 13/201,662

(22) PCT Filed: Mar. 31, 2010

(86) PCT No.: PCT/EP2010/054312
§ 371 (c)(1),
(2), (4) Date: Aug. 16, 2011

(87) PCT Pub. No.: WO2010/115807
PCT Pub. Date: Oct. 14, 2010

(65) Prior Publication Data
US 2011/0301819 A1    Dec. 8, 2011

(30) Foreign Application Priority Data
Apr. 6, 2009   (DE) .......................... 10 2009 002 205

(51) Int. Cl.
*G06F 7/00* (2006.01)
(52) U.S. Cl.
USPC ............... 701/51; 701/52; 475/122; 475/335; 474/11
(58) Field of Classification Search
USPC . 701/51, 52; 475/303, 269, 335, 122; 474/11, 474/13
See application file for complete search history.

(56) References Cited

U.S. PATENT DOCUMENTS

| | | | |
|---|---|---|---|
| 5,099,711 A | 3/1992 | Langbo et al. | |
| 5,697,251 A | 12/1997 | Lorriette et al. | |
| 6,006,622 A * | 12/1999 | Bischof et al. | 74/440 |
| 6,196,944 B1 * | 3/2001 | Schmitz | 475/303 |
| 6,301,984 B1 | 10/2001 | Petzold | |
| 7,357,235 B2 * | 4/2008 | Schmidt et al. | 192/53.1 |
| 7,827,876 B2 | 11/2010 | Guggolz et al. | |
| 2010/0041513 A1 | 2/2010 | Doebele et al. | |
| 2011/0009229 A1 | 1/2011 | Bauknecht et al. | |
| 2011/0108384 A1 * | 5/2011 | Reisch et al. | 192/69 |

FOREIGN PATENT DOCUMENTS

| | | |
|---|---|---|
| DE | 692 13 310 T2 | 4/1997 |
| DE | 197 56 637 A1 | 6/1999 |
| DE | 199 15 200 A1 | 10/2000 |
| DE | 10 2005 054 767 | 5/2007 |

(Continued)

*Primary Examiner* — Gertrude Arthur Jeanglaude
(74) *Attorney, Agent, or Firm* — Davis & Bujold, PLLC

(57) ABSTRACT

A method of operating a transmission (1) with at least one interlocking shift element (F) having at least two shift element halves that can be brought into interlocked engagement with one another. When a command is received to close the interlocking shift element (F), a current rotational speed difference between the shift element halves of the interlocking shift element (F) and the current positions of the shift element halves are determined. If the rotational speed difference is smaller than a first speed difference threshold value and if a tooth-on-tooth position has occurred at the interlocking shift element (F), then to release the tooth-on-tooth position, the actuation force is changed to a release level at which a rotational speed difference above a second speed difference threshold value is produced between the shift element halves.

11 Claims, 2 Drawing Sheets

FOREIGN PATENT DOCUMENTS

| | | |
|---|---|---|
| DE | 10 2006 046 605 A1 | 4/2008 |
| DE | 10 2008 000 429 A1 | 9/2009 |
| EP | 0 750 140 A2 | 12/1996 |
| EP | 1 767 829 A2 | 3/2007 |

* cited by examiner

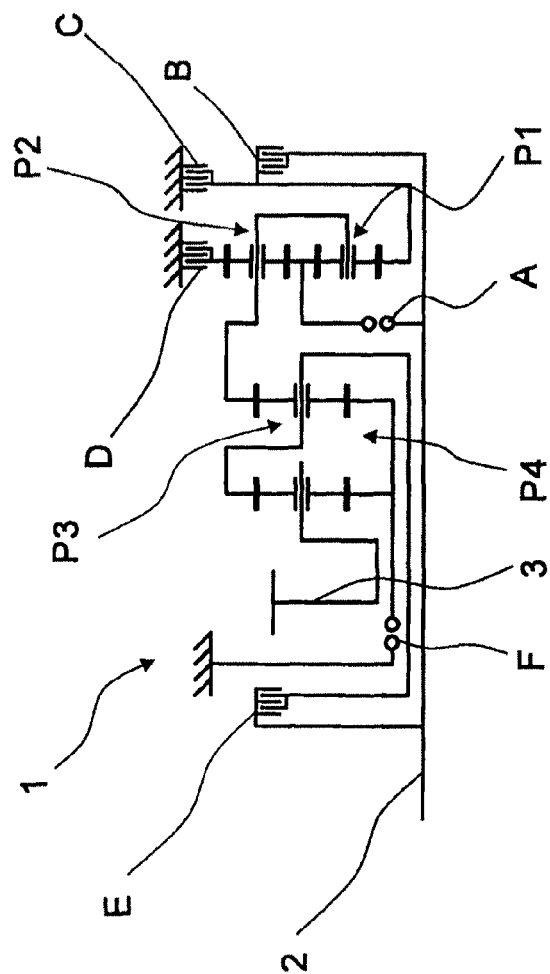

METHOD FOR OPERATING A TRANSMISSION WITH AT LEAST ONE POSITIVE-LOCKING SHIFTING ELEMENT

This application is a National Stage completion of PCT/EP2010/054312 filed Mar. 31, 2010, which claims priority from German patent application Ser. No. 10 2009 002 205.8 filed Apr. 6, 2009.

FIELD OF THE INVENTION

The invention concerns a method for operating a transmission with at least one positive-locking shifting.

BACKGROUND OF THE INVENTION

A shifting device for connecting components of a transmission that are rotating at different speeds, is known from DE 197 56 637 A1. For each shifting group of a range-change transmission, a unit is provided in the shifting device, in which valves, a shifting cylinder, a piston and shift elements are combined. Pulsed 2/2-way valves are used as release valves. In addition, in each case a displacement measuring device is provided, by means of which the current position of a piston in relation to a shifting cylinder can be indicated. Thus, when gearwheels are engaged in torque-transmitting connection, the possibility exists of adapting the shifting force and the shifting time.

To shift a shifting piston in the shifting cylinder, a pneumatic or hydraulic pressure medium from an external pressure source is delivered, via pressure lines, to the shifting device. In each of the pressure lines are interposed two electromagnetic 2/2-way valves, which control the flow of the pressure medium through the pressure lines in such manner that the shifting piston moves at a speed which corresponds to an optimum speed in the displacement position concerned, determined empirically or by a simulation.

For this, the control of the pulsed valves is designed such that all of the valves can be activated individually, in opposition to, or together with one another. Thereby various shifting piston speeds and thus also differing dynamic forces can be obtained.

The shifting piston speed is varied by two respective 2/2-way pulsed valves in such manner that during its shifting displacement, up to the beginning of synchronization in the transmission the shifting piston is moved as much as possible under full pressure force, and after the end of the synchronization phase, it is brought to its end position at a lower speed.

On entering a synchronization phase of the transmission, shortly before encountering a stop surface the shifting piston pauses in a retention position such that in this position the pressure acting on the shifting piston increases considerably due to a further pressure medium pulse via the pressure medium lines.

With the shifting device proposed, a variation of the synchronization times is possible by virtue of the electronic control of the pulsed valves. Thus, the synchronization processes for shifts on level ground, downhill gradients and uphill gradients can be carried out differently. During shifts on level ground the synchronization devices can be operated as gently as possible. On downhill gradients the synchronization devices can be subjected to a higher pulse frequency and used up to a maximum load, which can there lead to safety-relevant, shorter shifting times. The shifting speeds can be optimized thanks to the variability of the shifting and synchronization forces.

To avoid shifts when there is a tooth-on-tooth position between the respective tooth profiles to be connected, it is proposed to monitor such an operating situation. If a tooth-on-tooth position occurs, the synchronization force acting on the shifting piston during the synchronization phase is minimized, in order to produce a drag torque in the synchronization associated with the positive-locking shifting element and thereby release the tooth-on-tooth position in the area of the positive-locking shifting element.

A disadvantage of this, however, is that the mechanical synchronizers, provided for synchronizing positive-locking shifting elements, take up considerable structural space and are characterized by substantial complexity of design as well as control and regulation.

In contrast to shifts in which at least one positive-locking shifting element that can be synchronized by a mechanical synchronizer is involved, shifts or powershifts carried out at least with one purely positive-locking shifting element without any associated mechanical synchronizer cannot be carried out to the desired extent with reproducible shifting quality and within predefined shifting times since, as is known, the closing point of purely positive-locking shifting elements cannot be reached to the desired extent at a predefined time point by conventional methods.

SUMMARY OF THE INVENTION

Accordingly, the purpose of the present invention is to provide a method for operating a transmission with at least one positive-locking shifting element, by means of which a positive-locking shifting element involved in a shifting operation can be actuated without additional mechanical synchronization, with reproducibly high shifting quality, within predefined shifting times to the desired extent.

In the method according to the invention for operating a transmission with at least one positive-locking shifting element having at least two shift element halves that can be brought into positive-locking engagement with one another in the area of tooth profiles, the positive-locking shifting element is disengaged and engaged by a relative movement of the shift element halves, related to an actuation force of the positive-locking shifting element, between a first end position equivalent to a disengaged operating condition of the positive-locking shifting element and a second end position equivalent to an engaged operating condition of the positive-locking shifting element. During an engaging process the occurrence of a tooth-on-tooth position of the positive-locking shifting element is monitored, in which the shift element halves are, without proper positive-lock, in positions between the first end position and the second end position and are only in frictional engagement with one another in the area of front faces of the tooth profiles that face toward one another. When it is required to engage the positive-locking shifting element, the positive-locking shifting element is acted upon by an actuating force which actuates the shift element in the engaging direction.

To be able to carry out shifting operations, preferably powershifts, with a purely positive-locking shifting element, with reproducible shifting quality within predefined shifting times, when a command is received to engage the positive-locking shifting element, a current rotational speed difference between the shift element halves of the positive-locking shifting element and the current positions of the shift element halves are determined, and if there is a rotational speed difference smaller than a first speed difference threshold value and a tooth-on-tooth position of the positive-locking shifting element exists, then to release the tooth-on-tooth position the actuation force is brought down to a release level at which a rotational speed difference between the shift element halves, which is above a second speed difference threshold value, is reached.

With the procedure according to the invention, particularly during powershifts, in each case an engagement or closing of a purely positive-locking shifting element without additional mechanical synchronization means, in a simple manner, with high shifting quality and within predefined shifting times, is ensured. This results from the fact that when there is a tooth-on-tooth position in the area of tooth profiles of a purely positive-locking shifting element, which prevents immediate engagement of a shift element and formation of the positive-lock, in a simple manner the tooth-on-tooth position can be released by changing, preferably reducing, the actuation force to a release level of the actuation force, at which a rotational speed difference larger than a second speed difference threshold value is produced between the shift element halves of the positive-locking shifting element, without additional mechanical synchronization, within defined shifting times and with reproducible shifting quality, so that the desired positive-lock is produced.

When a positive-locking shifting element is actuated with an actuation force at the release level, the friction in the area of the front faces of the tooth profiles between the shift element halves is reduced, at least for a short time, whereby a rotational speed difference between the shift element halves increases and the frictional connection between the shift element halves that exists due to the tooth-on-tooth position is released in a controlled manner. In this way an uncontrolled, abrupt release of the tooth-on-tooth position which would spoil the shifting quality is avoided in a simple, inexpensive and space-saving manner. In addition shift operations, preferably powershifts, during which in each case an positive-locking shifting element has to be engaged, can be carried out within predefined shifting times by virtue of the procedure according to the invention, since the closing time of an positive-locking shifting element can be reproduced exactly and reliably by the controlled release of a tooth-on-tooth position.

In an advantageous variant of the method according to the invention, the release level of the actuation force is varied as a function of the actual torque to be transmitted by the positive-locking shifting element. In a simple way this provides the possibility of releasing a tooth-on-tooth position of the positive-locking shifting element in an operating-situation-dependent manner. Thus for example, when the torque to be transmitted by the positive-locking shifting element is higher, the release level of the actuation force is set higher than for lower torques to be transmitted by the positive-locking shifting element. The result of this is that the rotational speed difference between the shift element halves during a shifting operation is within a speed range that is advantageous for actuating the positive-locking shifting element, regardless of the actual torque to be transmitted by the positive-locking shifting element, essentially for all shifting operations.

To be able to release the tooth-on-tooth position in the area of the positive-locking shifting element with greater spontaneity, the actuation force is changed to the release level abruptly.

If the actuation force is changed to the release level along a ramp, the system behavior of the positive-locking shifting element is more sensitive, i.e. a tooth-on-tooth position can be released with greater sensitivity than when the actuation force is changed abruptly, and this in turn has a positive effect on the shifting quality.

In further advantageous variants of the method according to the invention, when a release of a tooth-on-tooth position in the area of the positive-locking shifting element has been detected, the actuation force is changed abruptly or along a ramp to a closing level that engages the positive-locking shifting element, and in doing this the shifting quality can be controlled with greater sensitivity by changing the actuation force along a ramp than by an abrupt change thereof, which again has a positive effect on shifting quality.

The closing level of the actuation force can be varied as a function of the torque actually to be transmitted by the positive-locking shifting element, whereby the positive-locking shifting element can be brought to and held in the engaged operating condition in an operating-condition-dependent manner.

In further advantageous embodiments the first rotational speed difference threshold value and/or the second one is/are essentially equal to zero.

Furthermore, depending on the application concerned the second rotational speed difference threshold value can be higher than or equal to the first one, which can also be different from zero, in order to be able to carry out the required shifting operation within a predefined shifting time with high shifting quality.

The rotational speed difference threshold values can be determined empirically and recorded in data sources such as characteristic curves, performance matrices or tables, and the data sources can be predefined and/or designed to be adaptable over the life of a shift element as a function of a driver type or other suitable characteristics. Moreover, in further variants of the method according to the invention the speed difference threshold values are determined theoretically using appropriate models, as a function of various operating parameters of the positive-locking shifting element, the transmission comprising the positive-locking shifting element and/or the drive-train of a vehicle constructed with the transmission.

BRIEF DESCRIPTION OF THE DRAWINGS

Further advantages and advantageous further developments of the invention emerge from the claims and from the example embodiment whose principle is described below with reference to the drawings, which show:

FIG. 1: A gearwheel layout of a transmission with a plurality of frictional and positive-locking shifting elements for obtaining various gear ratios;

FIG. 2: A shifting scheme for the transmission shown in FIG. 1;

DETAILED DESCRIPTION OF THE PREFERRED EMBODIMENTS

Figure 4:
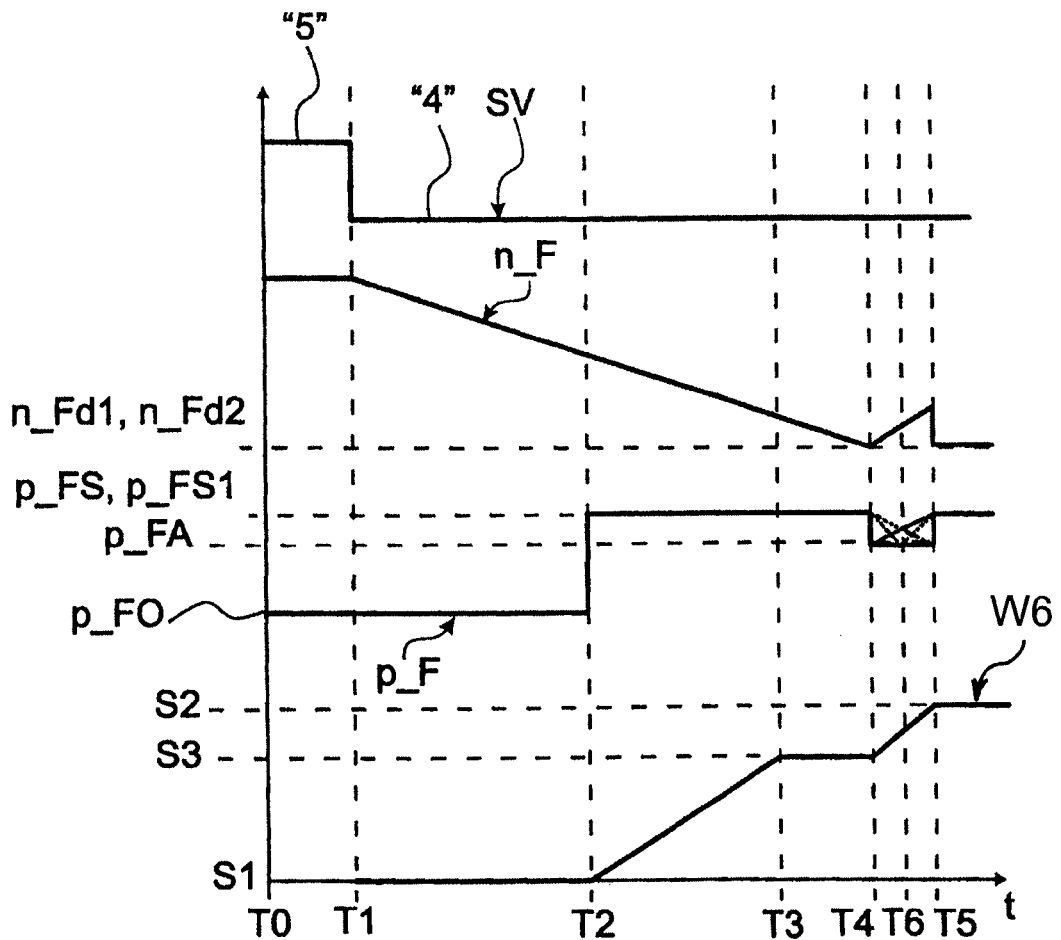
FIG. 4: A number of alternative variations with time t, of various operating condition parameters of the transmission shown in FIG. 1 during a downshift.

FIG. 1 shows a gearwheel layout of a transmission 1 or multi-stage transmission, which is basically known from the unpublished German patent application DE 10 2008 000 429.4 by the present applicant. The transmission 1 comprises a driveshaft 2 and an output shaft 3, which when fitted in a vehicle is connected to a drive output of the vehicle whereas the driveshaft 2 is actively connected to a drive machine.

In addition the transmission 1 is constructed with four planetary gearsets P1 to P4, such that the first and second planetary gearsets P1, P2, which are preferably in the form of minus planetary gearsets, form a shiftable upstream gearset while the third and fourth planetary gearsets P3, P4 constitute the main gearset. Furthermore, the transmission 1 comprises six shift elements A to F, of which the shift elements C, D, and F are brakes and the shift elements A, B and E are designed as shifting clutches.

With the shift elements A to F, in accordance with the shifting logic shown in detail in FIG. 2 nine forward gears "1" to "9" and one reverse gear "R" can be engaged selectively, in such manner that, except for the fourth gear "4", to obtain a gear ratio step in the transmission 1 or to produce a power flow in the transmission 1 in each case three shift elements at the same time have to be shifted to or held in an engaged operating condition.

In the present case the shift elements A to F are in the form of purely positive-locking shifting elements without any associated mechanical synchronization, so that during the operation of the transmission 1, by comparison with transmission devices constructed only with frictional shift elements, drag torques caused by disengaged frictional shift elements are reduced, and by comparison with transmission made with positive-locking shifting elements having associated synchronizers, shift operations can be carried out with a more space-saving and inexpensive transmission.

In general, with transmissions made as automatic transmissions that use positive-locking shifting elements as well as frictional shift elements, despite having actuated a positive-locking shifting element during a shifting operation, it is not the case that the positive-lock required in the area of a positive-locking shifting element in order to transmit the torque applied can always be produced. This is so, for example, if a so-termed tooth-on-tooth position occurs. Particularly during a downshift for which a positive-locking shifting element has to be engaged, if a tooth-on-tooth position occurs the positive-locking shifting element cannot be engaged completely to give the required positive-lock. The same problem also arises in upshifts for which the shift element to be engaged is in the form of a positive-locking shifting element. Since during the operation of transmissions a tooth-on-tooth position occurs substantially more frequently than a direct meshing process of positive-locking shifting elements, during shifting operations the desired positive-lock is often not at first achieved in the area of positive-locking shifting elements within a predefined shifting time.

Figure 3:
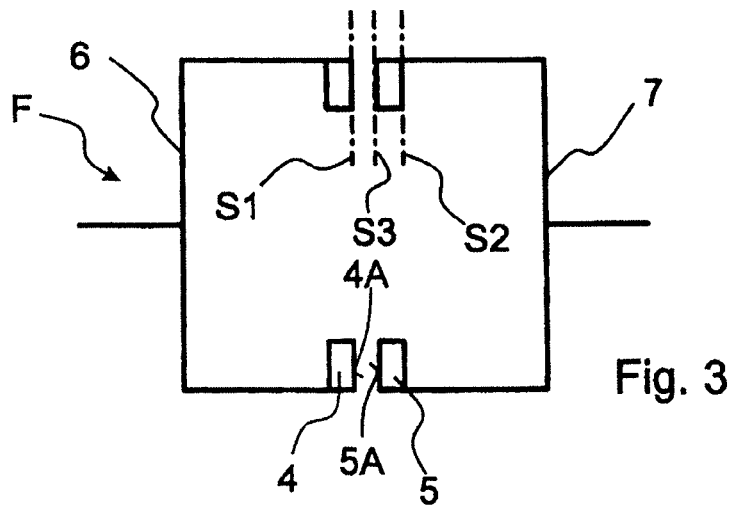
FIG. 3: A very schematic representation of a positive-locking shifting element in the transmission of FIG. 1.

FIG. 3 shows a schematic, enlarged detailed view of the shift element F which, during a downshift from the fifth forward gear "5" to the fourth forward gear "4", has to be engaged within a predefined shifting time and in a controlled manner if high shifting quality is to be achieved. The positive-locking shifting element F with its two shift element halves 6 and 7 that can be brought into positive-locking engagement with one another in the area of their tooth profiles 4, 5, is disengaged and engaged by a relative movement that depends on an actuation force of the positive-locking shifting element F, between a first end position S1 of the shift element halves 6 and 7 equivalent to a disengaged operating condition of the positive-locking shifting element F and a second end position S2 of the shift element halves 4 and 5 equivalent to an engaged operating condition of the positive-locking shifting element F. In this case the shift element half 7 is designed to be immobile whereas the first shift element half 6 is designed to be able to move between the first shift position S1 and the second shift position S2, in the axial direction relative to the second shift element half 7.

In other embodiments of the positive-locking shifting element F, it is the first shift element half 6 which cannot move in the axial direction and the second shift element half 7 which is designed to move relative to the shift element 6 in the axial direction by the amount necessary for actuating the shift element F, or else, both shift element halves 6 and 7 can move in the axial direction.

In the present case, during an engaging process the shift element F is acted upon in a manner known per se by a hydraulic actuating pressure, which is converted to mechanical energy by a control piston (not shown) and moves the shift element half 6 relative to the second shift element half 7 in the axial direction.

Owing to the above-mentioned situation, a tooth-on-tooth position often occurs in the area of the shift element F, which impedes the positive-lock in the area of the shift element F required for the downshift. This produces between the shift element halves 6 and 7, in the area of front faces 4A, 5A of the tooth profiles 4, 5 facing one another, a frictional, preferably slip-free connection which, during the operation of the transmission 1, is released abruptly when a certain load point is exceeded. The positive-lock of the positive-locking shifting element F is then formed in an uncontrolled and abrupt manner, whereby noise that detracts from the driving comfort is sometimes produced.

With reference to the representation in FIG. 4 a procedure is described below, by virtue of which shifting operations that involve in each case at least one of the positive-locking shifting elements A or F of the transmission 1 can be carried out with reproducible shifting quality and within predefined shifting times. The method is implemented during a downshift from the fifth forward gear "5" to the fourth forward gear "4". In particular, by means of the method described in detail below shifting operations can be carried out with reproducible shifting times without uncontrolled, abrupt release of a tooth-on-tooth position in the area of a positive-locking shifting element A or F, whereby the positive-locking shifting elements A and F can be closed or engaged with substantially less noise than is possible with conventional shifting sequences.

At a time T0 the fifth forward gear "5" is engaged in the transmission 1 and at a time T1 a command arrives for a downshift from the fifth forward gear "5" to the fourth forward gear "4", whereupon a shift process SV represented as a function of time t jumps from a value equivalent to the fifth forward gear "5" to a value equivalent to the fourth forward gear "4". To carry out the required downshift the positive-locking shifting element F has to be engaged, while the positive-locking shifting element A and the frictional shift element B have to be disengaged.

At the time T1 of the shift command the transmission capacities of the shift elements A and B are reduced. By reducing the transmission capacity of the frictional shift element B to be disengaged while at the same time the positive-locking shifting element A is disengaged, the rotational speed difference n_F is reduced from time T1 onward.

To implement the command to engage the positive-locking shifting element F, the positive-locking shifting element has to be acted upon in the area of the shift element half 6 with an actuation force that actuates the positive-locking shifting element F in the engaging direction. For this, the actuating pressure p_F or actuation force of the positive-locking shifting element F is increased, from a time T2, from a pressure value p_F0 equivalent to a disengaged operating condition of the positive-locking shifting element F up to engaging level p_FS. The result of increasing the actuating pressure p_F is that, starting from its first shift position S1 or its first end-stop, which corresponds to a fully disengaged operating condition of the positive-locking shifting element F, the shift element half 6 is moved in the direction toward its second end position or shift position S2. The various positions of the shift element half 6 relative to the shift element half 7 are represented in detail by the line W6 in FIG. 4.

With the command to engage the positive-locking shifting element F, monitoring is also started, of the current rotational speed difference n_F between the shift element halves 6 and 7 of the positive-locking shifting element F and of the current positions of the shift element halves 6 and 7, the speed difference n_F between the shift element halves 6 and 7 in the present case being determined by measurement using appropriate sensors, or determined by computer means in other embodiments of the transmission.

This means that during an engaging process of the positive-locking shifting element F the occurrence of a tooth-on-tooth position in the area of the positive-locking shifting element F is monitored, in which the shift element halves 6, 7 are located, without definite positive-lock, in position S3 between the first end position S1 and the second end position S2, and are only in frictional engagement with one another, essentially without slip, in the area of the front faces 4A and 5A of the tooth profiles 4 and 5 facing one another.

If a rotational speed difference n_F between the shift element halves 6 and 7 smaller than a first speed difference threshold value n_Fd1 is determined and if the shift element half 6 has not yet reached the second end position S2 and is in a position S3, by means of the monitoring in the area of the positive-locking shifting element F, a tooth-on-tooth position is determined in the manner described below.

At time T3 the shift element half 6 reaches the position S3 between the first end position S1 and the second end position S2. Since, despite being correspondingly acted upon by the actuating pressure p_F, after time T3 the first shift element half 6 does not move farther in the direction toward the shift element half 7 or the second end position S2 and the rotational speed difference n_F at the positive-locking shifting element is smaller from time T3 than the first speed difference threshold value n_Fd1 and is essentially equal to zero, a tooth-on-tooth position in the area of the positive-locking shifting element F is recognized. During this, by virtue of the monitoring, the tooth-on-tooth position determined is evaluated and after the passage of the time interval between times T3 and T4 it is recognized that the tooth-on-tooth position is preventing the formation of positive-lock in the area of the positive-locking shifting element F within a predefined shifting time.

To release the tooth-on-tooth position, the actuating pressure p_F or actuation force of the positive-locking shifting element F is reduced at a time T4 to a release level p_FA of the actuation force or actuating pressure, at which a speed difference n_F above a second rotational speed difference threshold value n_Fd2 is produced between the shift element halves, which in the present case is the same as the first speed difference threshold value n_Fd1 but in other variants of the method deviates therefrom to an appropriate extent depending on the application concerned, in order to enable the shifting operation concerned to be carried out to the desired extent.

In this context the release level p_FA of the actuating pressure p_F of the positive-locking shifting element F corresponds to a pressure level at which the friction between the shift element halves 6 and 7 or the clutch partners becomes such that, between the shift element halves 6 and 7, a rotation speed difference value above the second speed difference threshold value n_Fd2 which favors the positive-lock of the positive-locking shifting element F is produced, where n_Fd2 corresponds to a very low speed level. While due to the lowering of the actuating pressure p_F, the speed difference n_F increases toward a speed value above the second speed difference threshold value n_Fd2 and the tooth-on-tooth position in the area of the positive-locking shifting element F is released, the first shift element half 6 is moved to its second end position S2. At time T5 the tooth profiles 4 and 5 of the shift element halves 6 and 7 are in fully positive-locked engagement and the first shift element half 6 has reached its second end position S2.

Since the positive-lock in the area of the positive-locking shifting element F is fully engaged at time T5 and the release of a tooth-on-tooth position in the area of the positive-locking shifting element F has been recognized, the actuation force or actuating pressure p_F of the positive-locking shifting element is increased again from time T5 to an engaging level p_FS1 that holds the positive-locking shifting element in the engaged operating position, which in this case corresponds to the closing pressure level p_FS between times T2 and T4 but in other variants of the method according to the invention can differ therefrom depending on the application concerned or even depending on the operating situation.

In a variant of the method, in accordance with the continuous line representing the variation of the actuating pressure p_F, the actuating pressure p_F of the positive-locking shifting element F is first reduced abruptly to the release level p_FA at time T4 during a negative pressure pulse, and then abruptly increased at time T5 to the closing level p_FS1.

In an alternative variant of the above-described method, at time T4 the actuating pressure p_F is first reduced in the manner indicated in detail by the dash-dot line along a pressure ramp, and then at time T5 it is increased abruptly up to the closing pressure level p_FS1, in order to release the tooth-on-tooth positions in the area of the positive-locking shifting element as described earlier in a controlled and quiet manner and to produce the positive-lock in the area of the positive-locking shifting element F within a predefined shifting time with good shifting quality.

In a further variant of the method described earlier alternative to the above, at time T4 the actuating pressure p_F is first reduced abruptly in accordance with the continuous line to the release level p_FA and then increased along a pressure ramp indicated in FIG. 4 as a 2-point broken line up to the engaging pressure level p_FS1 at time T5, in order to release the tooth-on-tooth positions in the area of the positive-locking shifting element as described earlier in a controlled and quiet manner and to produce the positive-lock in the area of the positive-locking shifting element F within a predefined shifting time with good shifting quality.

A further alternative procedure provides that from time T4 the actuating pressure p_F of the positive-locking shifting element is reduced along a pressure ramp indicated as the 3-point broken line, as far as a time T6 earlier than T5, and is then increased along a further pressure ramp up to the engaging pressure level p_FS1 at time T5, in order to release the tooth-on-tooth positions in the area of the positive-locking shifting element as described earlier in a controlled and quiet manner and to produce the positive-lock in the area of the positive-locking shifting element F within a predefined shifting time with good shifting quality.

Compared with an abrupt change, varying the actuating pressure p_F of the positive-locking shifting element F along a ramp always enables finer adjustment and more sensitive actuation of the positive-locking shifting element F, with a positive effect on the shifting quality.

Regardless of which alternative of the procedure according to the invention is chosen, the downshift from the fifth forward gear "5" to the fourth forward gear "4" can in each case be carried out with the necessary and desired shifting quality within a predefined shifting time.

Shifting operations, particularly powershifts, which involve at least one positive-locking shifting element and preferably also a frictional shift element, can generally be performed by means of the method described above with reproducible shifting behavior. During this, in particular the shifting times of such shifting operations are kept, without additional mechanical synchronization means, without uncontrolled and abrupt release of a tooth-on-tooth position in the area of the positive-locking shifting element to be engaged for carrying out the required shift, and with little actuation effort.

The frictional connection of the tooth-on-tooth position is released by changing the actuation force and the positive-lock is produced in a controlled manner at very small rotational speed differences between the shift element halves of a positive-locking shifting element along with the exertion of relatively large force on the moving portion(s) of the positive-locking shifting element.

A positive-locking shifting element can be actuated not only by exerting hydraulic pressure, but also by means of an electric control element or by applying force by pneumatic means, and in such cases the controlled release of the tooth-on-tooth position and the controlled and quiet engagement of the positive-locking shifting element are effected by appropriate adjustment of the pneumatic pressure or the actuating current of the electric control element, to the same extent as for the above-described hydraulic control of the positive-locking shifting element F of the transmission 1.

INDEXES

1 Transmission
2 Driveshaft
3 Output shaft
4, 5 Tooth profile
4A, 5A Front face
6, 7 Shift element half
"1" to "9" Gear ratio for forward driving
A to F Shift element
n_F Rotation speed difference at the positive-locking shifting element F
n_Fd1 First rotation speed difference threshold
n_Fd2 Second rotation speed difference threshold
SV Shift sequence
p_F Actuating process of the positive-locking shifting element
p_FS Closing level
p_FO Opening pressure level
p_FA Release level
p_FS1 Closing level
S1 First end position
S2 Second end position
S3 Third shift position
T0 to T6 Discrete time points
t Time
W6 Variation of the relative movement of the shift element half 6

The invention claimed is:

1. A method of operating a transmission (1) with at least one positive-locking shifting element (A, F) having at least two shift element halves (6, 7) that are brought into positive-locking engagement with one another in an area of tooth profiles (4, 5) such that the positive-locking shifting element (F) is disengaged and engaged, by relative movement (W6) which is a function of an actuation force of the positive-locking shifting element (F), between a first end position (S1) of the shift element halves (6, 7) that is equivalent to a disengaged operating condition of the positive-locking shifting element (F) and a second end position (S2) of the shift element halves (6, 7) that is equivalent to an engaged operating condition of the positive-locking shifting element, and, during the engaging process, an occurrence of a tooth-on-tooth position at the positive-locking shifting element (F) is monitored, in which the shift element halves (6, 7) are positioned (S3) between the first end position (S1) and the second end position (S2) without interlock and are only in frictional engagement with one another in an area of front faces (4A, 5A) of their tooth profiles (4, 5), and when a command is received for engaging the positive-locking shifting element (F), the positive-locking shifting element (F) is acted upon with the actuation force (p_FS) which actuates the shift element in an engaging direction, the method comprising the steps of:

determining, when a command is received for engaging the positive-locking shifting element (F), a current rotational speed difference (n_F) between the shift element halves (6, 7) of the positive-locking shifting element (F) and current positions (W6) of the shift element halves (6, 7); and changing the actuation force to a release level (p_FA), if the speed difference (n_F) is smaller than a first rotational speed difference threshold value (n_Fd1) and a tooth-on-tooth position of the positive-locking shifting element (F) is detected, to release the tooth-on-tooth position such that the actuation force at the release level (p_FA) produces a speed difference (n_F) between the shift element halves (6, 7) which is above a second rotational speed difference threshold value (n_Fd2).

2. The method according to claim 1, further comprising the step of varying the release level (p_FA) of the actuation force (p_F) as a function of torque currently to be transmitted by the positive-locking shifting element (F).

3. The method according to claim 1, further comprising the step of abruptly changing the actuation force (p_F) to the release level (p_FA).

4. The method according to claim 1, further comprising the step of changing the actuation force (p_F) to the release level (p_FA) along a ramp.

5. The method according to claim 1, further comprising the step of, when the release of the tooth-on-tooth position in the area of the positive-locking shifting element (F) is recognized, abruptly changing the actuation force (p_F) to an engaging level (p_FS1) that engages the positive-locking shifting element.

6. The method according to claim 1, further comprising the step of, when the release of the tooth-on-tooth position in the area of the positive-locking shifting element (F) is recognized, changing the actuation force (p_F) along a ramp to an engaging level (p_FS1) that engages the positive-locking shifting element.

7. The method according to claim 5, further comprising the step of varying the engaging level (p_FS1) of the actuation force (p_F) as a function of torque currently to be transmitted by the positive-locking shifting element.

8. The method according to claim 1, further comprising the step of defining the first rotational speed difference threshold value (n_Fd1) as substantially zero.

9. The method according to claim 1, further comprising the step of defining the second rotational speed difference threshold value (n_Fd2) as substantially zero.

10. The method according to claim 1, further comprising the step of determining the rotational speed difference (n_F) between the shift element halves (6, 7) by measurement.

11. The method according to claim 1, further comprising the step of determining the rotational speed difference (n_F) between the shift element halves (6, 7) by computation.

* * * * *